(12) United States Patent
Morikuni et al.

(10) Patent No.: US 7,961,389 B2
(45) Date of Patent: *Jun. 14, 2011

(54) SCREEN AND PROJECTOR

(75) Inventors: Eiji Morikuni, Matsumoto (JP); Akira Shinbo, Shiojiri (JP); Hideya Seki, Okaya (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/813,775

(22) Filed: Jun. 11, 2010

(65) Prior Publication Data

US 2010/0245996 A1     Sep. 30, 2010

Related U.S. Application Data

(63) Continuation of application No. 11/842,614, filed on Aug. 21, 2007, now Pat. No. 7,764,425.

(30) Foreign Application Priority Data

Aug. 28, 2006  (JP) .................................. 2006-230185
Aug. 6, 2007   (JP) .................................. 2007-203866

(51) Int. Cl.
  *G03B 21/56*  (2006.01)
  *G03B 21/60*  (2006.01)
(52) U.S. Cl. ........................................ 359/446; 359/457
(58) Field of Classification Search .................. 359/446, 359/457, 453
    See application file for complete search history.

(56) References Cited

U.S. PATENT DOCUMENTS

| 3,125,927 A | 3/1964 | Erban |
| 3,610,728 A | 10/1971 | Firth |
| 3,640,602 A | 2/1972 | Wolfe |
| 4,143,943 A | 3/1979 | Rawson |
| 4,390,239 A | 6/1983 | Huber |
| 5,675,435 A | 10/1997 | Ishii et al. |
| 6,516,146 B1 | 2/2003 | Kosaka |
| 7,764,425 B2 * | 7/2010 | Morikuni et al. ............. 359/446 |
| 2007/0247707 A1 | 10/2007 | Michimori et al. |
| 2008/0007827 A1 | 1/2008 | Kinoshita et al. |
| 2008/0037117 A1 | 2/2008 | Seki et al. |

FOREIGN PATENT DOCUMENTS

| JP | U-63-165638 | 10/1988 |
| JP | A-04-130879 | 5/1992 |
| JP | A-2001-100316 | 4/2001 |
| JP | A-2005-107150 | 4/2005 |

OTHER PUBLICATIONS

Apr. 3, 2009 Office Action issued in U.S. Appl. No. 11/842,614.
Oct. 30, 2009 Office Action issued in U.S. Appl. No. 11/842,614.
Mar. 11, 2010 Notice of Allowance issued in U.S. Appl. No. 11/842,614.

* cited by examiner

*Primary Examiner* — Christopher Mahoney
(74) *Attorney, Agent, or Firm* — Oliff & Berridge, PLC

(57) ABSTRACT

There is provided a screen and a projector using a simple configuration and operation to make speckles less visible. A screen 10 on which light beams are incident includes a lenticular lens 11 as a first layer having viewing angle control means for enlarging the viewing angle and a Fresnel lens 12 as a second layer having angular conversion means for converting the angles of incidence of the incident light beams into the substantially same direction. One of the first and second layers has a diffusion capability that diffuses the incident light beams and has moving means for moving that layer relative to the other. Alternatively, the first and second layers both have the diffusion capability, and at least one of the layers has moving means for moving that layer relative to the other.

12 Claims, 6 Drawing Sheets

SCREEN AND PROJECTOR

This is a Continuation of application Ser. No. 11/842,614 filed Aug. 21, 2007. The disclosure of the prior application is hereby incorporated by reference herein in its entirety.

BACKGROUND OF THE INVENTION

The present invention relates to a screen on which light beams are incident and a projector that projects an optical image onto the screen.

A conventional projector that projects an optical image onto a screen, such as a rear projector, increasingly has a larger screen and higher resolution (a rear projector is an apparatus including a projector and a screen, both housed in a housing, and projecting images from the projector onto the screen to allow a viewer to look at the images passing through the screen). In such circumstances, the glare (so-called scintillation) generated on the screen has been a problem. Scintillation results from intensity (brightness) unevenness of light called speckles generated when the wave of light beams that exit from the screen interfere with each other.

JP-A-2005-107150 discloses an apparatus for reducing generation of speckles by pneumatically or electrically oscillating at least one of two or more screens to bend the screen and randomize the refraction positions. JP-A-2001-100316 discloses a screen having a configuration in which the scatter distribution and phase of scattered waves in a light diffusion layer of the screen is temporarily varied and the light diffusion layer is combined with a Fresnel lens, a lenticular lens or the like.

SUMMARY OF THE INVENTION

In JP-A-2005-107150, the configuration of the screen is not clearly described and change in refraction position means change in focus position, disadvantageously resulting in less accurate focusing.

In JP-A-2001-100316, when a light diffusion layer is added to the screen, disposing the light diffusion layer on the light source side, which is the front stage of the focusing screen, disadvantageously resulting in a reduced amount of light and degradation in image quality (such as image blur).

The invention has been made in view of the above problems and aims to provide a screen and a projector using a simple configuration and operation to make speckles less visible.

To achieve the above objective, the screen of the invention is a screen on which light beams are incident and includes a first layer having viewing angle control means for enlarging the viewing angle and a second layer having angular conversion means for converting the angles of incidence of the incident light beams into the substantially same direction. One of the first and second layers has a diffusion capability that diffuses the incident light beams and has moving means for moving the one layer relative to the other.

According to such a screen, since the diffusion capability is imparted to one of the first layer having viewing angle control means and the second layer having angular conversion means, scattered waves with phases different from each other are superimposed to increase interference that causes speckles, resulting in uniform brightness. Furthermore, since the one layer having moving means moves relative to the other layer, a stationary interference pattern (speckle pattern) can be moved. Therefore, such a simple configuration and operation can make the speckles less visible to the viewer (the viewer feels less glare). In such a configuration, a light diffusion layer as another member is not required, thus alleviating problems of reduction in the amount of light and degradation of image quality (such as image blur).

To achieve the above objective, the screen of the present invention includes a first layer having viewing angle control means for enlarging the viewing angle and a second layer having angular conversion means for converting the angles of incidence of the incident light beams into the substantially same direction. The first and second layers have diffusion capabilities that diffuse the incident light beams. At least one of the layers has moving means for moving the one layer relative to the other.

According to such a screen, since the first layer having viewing angle control means and the second layer having angular conversion means both have the diffusion capability, scattered waves with phases more different from each other are superimposed to further increase interference that causes speckles, resulting in more uniform brightness, as compared to the case where one of the layers has the diffusion capability. Furthermore, since at least one of the first and second layers has moving means to move the one layer relative to the other, the speckle pattern can be moved. Therefore, such a simple configuration and operation can make the speckles further less visible to the viewer (the viewer feels further less glare). In particular, when the first and second layers both have the moving means, the speckle pattern can be further moved, as compared to the case where one of the layers has the moving means, so that the speckles can be further less visible to the viewer (the viewer feels further less glare). In such a configuration, a light diffusion layer as another member is not required, thus alleviating problems of reduction in the amount of light and degradation of image quality (such as image blur).

In the screen described above, it is preferable that the first layer is fixed and the second layer is moved by the moving means. This configuration provides an advantage similar to that described above. When this configuration is used in a rear projector, the first layer is typically disposed on the exterior side and the second layer is disposed on the back side of the first layer (interior side of the rear projector). In this case, since the first layer is fixed and the second layer is moved by the moving means so that the first layer is fixed relative to the viewer while the second layer is moving, the viewer does not visually recognize that the second layer is moving but only looks at the images projected on the screen. Furthermore, since it is possible to prevent the viewer from directly touching the moving second layer, the safety of the viewer can be improved. This configuration also improves the reliability of the screen capable of reducing speckles.

In the screen described above, it is preferable that the first layer is a lenticular lens and the second layer is a Fresnel lens. This configuration is similar to that of a typical screen, for example, a screen employed in a current rear projector. Therefore, by adding the moving means, the invention can be easily applied.

In the screen described above, when one of the Fresnel lens and the lenticular lens has the diffusion capability, it is preferable that the Fresnel lens moves at a linear velocity V, expressed by $V \geqq P \times 50$ (mm/sec), where P is the lens pitch of the Fresnel lens and V is the linear velocity.

In the screen described above, when one of the Fresnel lens and the lenticular lens has the diffusion capability, by setting the linear velocity V of the motion of the Fresnel lens to at least $P \times 50$ (mm/sec), it is possible to take into account the frequency response of the human eye (afterimage period) and characteristics of how the lens pitch P of the Fresnel lens changes the speckle pattern, thus making the speckles less recognizable.

The frequency response of the human eye indicates that when an object changes at a speed 50 Hz or faster, it is typically difficult for a viewer to recognize (a viewer hardly recognizes) that the object has changed. Therefore, when the speckle pattern that exits from the Fresnel lens changes at a speed of 50 Hz or faster, the viewer less likely recognizes the speckle pattern as glare, so that the viewer less likely recognizes the speckles as speckles. When the Fresnel lens moves, the motion changes the speckle pattern whenever the lens pitch of the Fresnel lens changes because the lens angle of the Fresnel lens slightly changes with the lens pitch. For example, when the viewer looks at one point, the speckle pattern does not change when the Fresnel lens is moving within one pitch but the speckle pattern changes at the instant when the Fresnel lens moves from that one pitch to the next pitch. Therefore, by setting the time required to pass through one pitch to 50 Hz (20 msec), the speckles become less recognizable. It is noted that the diffusion capability may be imparted to one of the Fresnel lens and the lenticular lens.

In the screen described above, when the Fresnel lens and the lenticular lens both have the diffusion capability, it is preferable that the Fresnel lens moves at a linear velocity V, expressed by $0<V\leq P\times 50$ (mm/sec), where P is the lens pitch of the Fresnel lens and V is the linear velocity.

According to such a screen, when the Fresnel lens and the lenticular lens both have the diffusion capability, the amount of change in the speckle pattern resulting from the superposition of the diffusion capabilities is larger than the amount of change in the speckle pattern resulting from the motion of the Fresnel lens. By setting the linear velocity V of the motion of the Fresnel lens to a value in the range of $0<V\leq P\times 50$ (mm/sec) while taking into account the frequency response of the human eye (afterimage period) and characteristics of how the lens pitch P of the Fresnel lens changes the speckle pattern, the speckles can be less recognizable.

It is noted that the linear velocity means the velocity when an object is moving, for example, when the object is moving along a curve, the velocity in the tangential direction on the moving path.

In the screen described above, when an optical image formed by a light modulation device including a plurality of pixels is projected on the screen on a pixel basis, it is preferable that the Fresnel lens moves in such a way that one first pixel projected on the screen moves in association with the motion of the Fresnel lens within the extent formed by second pixels located adjacent to and surrounding the first pixel.

According to such a screen, when the one first pixel projected on the screen moves in association with the motion of the Fresnel lens, the extent in which the Fresnel lens moves set in such a way that the first projected pixel moves within the extent formed by the second pixels located adjacent to and surrounding the first pixel substantially prevents the viewer who looks at images (optical images) projected on the screen from a position apart from the screen from recognizing that the image has moved.

In the screen described above, the moving means preferably includes an electromagnetic member and a magnetic member. By driving the electromagnetic member to attract or stop attracting the magnetic member in this configuration, the first or second layer can be moved relative to the other. Alternatively, both of the first and second layers can be moved.

In the screen described above, the moving means preferably includes a metal member that extends and shrinks in response to current variation. Extension and shrinkage of the metal member in response to current variation in this configuration can move the first or second layer relative to the other. Alternatively, both of the first and second layers can be moved.

In the screen described above, the moving means preferably moves the first or second layer in the direction substantially parallel to the layer that faces the moving layer. In this way, the first or second layer or the first and second layers moved by the moving means can move while preventing a gap between the two layers from increasing, suppressing reduction in image quality, such as image blur, associated with the motion.

In the screen described above, a protective member is preferably disposed between the first and second layers to protect the first and second layers. This configuration can suppress degradation of the viewing angle control function, the angular conversion function and the like, for example, due to rubbing in association with the motion of the surfaces of the first and second layers that face each other.

The projector of the invention includes any of the screens described above, a light source, a light modulation device that converts light beams emitted from the light source into an optical image according to image information, and a projection lens that projects the optical image formed by the light modulation device on the screen.

Such a projector emits light beams from the light source, uses the light modulation device to convert the emitted light beams into an optical image according to image information, and uses the projection lens to project the formed optical image on the screen. In the thus provided projector having such a configuration, speckles are less visible in the optical image (image) that exits from the screen. A viewer can look at the optical image (image) that exits from the screen without feeling glare.

DESCRIPTION OF THE PREFERRED EMBODIMENTS

Embodiments of the invention will be described below with reference to the drawings.

First Embodiment

FIG. 1 is a schematic view showing the relationship between the screen according to a first embodiment of the invention and incident light. FIG. 2 is a schematic view showing the extent within which a second layer moves. FIG. 3 is a schematic view showing the relationship between the motion of the second layer and a speckle pattern generated on the screen. The configuration and operation of the screen 10 will be described with reference to FIGS. 1 to 3.

As shown in FIG. 1, the screen 10 in this embodiment includes a first layer having viewing angle control means for enlarging the viewing angle and a second layer having angular conversion means for converting the angles of incident light beams having different angles of incident so that the incident light beams are emitted in a substantially same direction. One of the layers has a diffusion capability to diffuse incident light beams. As for the motion of the first and second layers, the one of the layers having the diffusion capability has moving means and moves relative to the other layer.

Specifically, the screen 10 in this embodiment includes a lenticular lens 11 as the first layer having viewing angle control means for enlarging the viewing angle and a Fresnel lens 12 as the second layer having angular conversion means for converting the angles of incidence of incident light beams into the substantially same direction. In this embodiment, the Fresnel lens 12 has the diffusion capability to diffuse incident light beams. Specifically, light diffusing material is added into the body of the Fresnel lens 12 in a substantially uniform manner to form the diffusion capability. The lenticular lens 11 does not have any diffusion capability. In this embodiment, the Fresnel lens 12 has the moving means and moves relative to the lenticular lens 11.

As shown in FIG. 1, the screen 10 of this embodiment is configured in such a way that light emitted from a light source 70 is projected through a projection lens 80 and incident on the Fresnel lens 12 as incident light. In FIG. 1, the incident light is schematically indicated by double-dashed line arrows.

In the screen 10 having such a configuration, the light diffusing material in the Fresnel lens 12 converts the incident light entering the Fresnel lens 12 into scattered waves with their phases shifted and disturbed. The scattered light exits from the Fresnel lens 12 and enters the lenticular lens 11. The light that enters the lenticular lens 11 is oriented especially in the horizontal direction and exits from the lenticular lens 11. The exiting light beams (scattered light beams) that exit from the lenticular lens 11 (exit from the screen 10) interfere with each other, so that the amount of generated speckles increases, resulting in more uniform brightness compared to the case where the Fresnel lens 12 has no diffusion capability.

The Fresnel lens 12 has the moving means as described above, which moves the Fresnel lens 12 having the diffusion capability in the direction substantially parallel to the layer of the lenticular lens 11 that faces the Fresnel lens 12 (indicated by the solid-line arrow in FIG. 1). Such a motion prevents a gap between the lenticular lens 11 and the Fresnel lens 12 from increasing. In this embodiment, the lenticular lens 11 is fixed and hence does not move.

The Fresnel lens 12 does not perform a reciprocating motion in one direction but a motion at a linear velocity of a predetermined value or larger at least during image display. Now, let V be the linear velocity of the Fresnel lens 12 and P be the lens pitch of the Fresnel lens 12. The linear velocity V can then be calculated by the equation (1).

$$V \geq P \times 50 \text{ (mm/sec)} \qquad (1)$$

It is noted that the equation (1) takes into account the frequency response (afterimage period) of the human eye and characteristics of how the lens pitch P of the Fresnel lens 12 changes the speckle pattern.

The frequency response of the human eye indicates that when an object changes at a speed of 50 Hz or faster, it is typically difficult for a viewer to recognize (a viewer hardly recognizes) that the object has changed. Therefore, when the speckle pattern that exits from the Fresnel lens 12 changes at a speed of 50 Hz or faster, the viewer less likely recognizes the speckle pattern as glare, so that the viewer less likely recognizes the speckles as speckles. When the Fresnel lens 12 moves, the motion changes the speckle pattern whenever the lens pitch P of the Fresnel lens 12 changes because the lens angle A of the Fresnel lens 12 slightly changes with the lens pitch P. For example, when the viewer looks at one point, the speckle pattern does not change when the Fresnel lens 12 is moving within one pitch but the speckle pattern changes at the instant when the Fresnel lens 12 moves from that one pitch to the next pitch.

Therefore, by setting the time required to pass through one pitch to 50 Hz (20 msec), the speckles become less recognizable.

In this embodiment, the lens pitch P of the Fresnel lens 12 is 0.1 mm, and the Fresnel lens 12 is only required to move through the distance of the lens pitch P (P=0.1 mm) in 20 msec. The linear velocity V in this embodiment is therefore calculated by the equation (1): V=0.1×50=5 mm/sec. For example, when images are being displayed on the screen 10, the Fresnel lens 12 is moved in such a way that the linear velocity V is always at least 5 mm/sec.

The lens pitch P varies depending on the Fresnel lens to be used, so that the lens pitch P of the Fresnel lens to be used is used to calculate the linear velocity.

The extent within which the first layer (the Fresnel lens 12 in this embodiment) moves will be described with reference to FIG. 2.

In this embodiment, as described above, the light from the light source 70 is projected through the projection lens 80. Specifically, the screen 10 is used in a rear projector, and a light modulation device 522 (see FIG. 5) uses the light from the light source 70 to form an optical image based on an image signal outputted from a control unit 530 (see FIG. 5) in a rear projector 500 (see FIG. 5).

The light modulation device 522 uses, for example, polysilicon TFTs (Thin Film Transistors) as switching elements, and includes a plurality of pixels. The light modulation device 522 modulates incident light beams according to image information and outputs them as an optical image.

When the optical image thus modulated and formed is enlarged and projected on the screen 10 through the projection lens 80, a plurality of substantially rectangular enlarged pixels G, part of which are shown in FIG. 2, are projected on the screen 10. The optical image corresponding to the pixels G is projected inside the pixels G.

As shown in FIG. 2, let one pixel of the pixels G projected on the screen 10 be a first pixel G1 (the pixel is shown in gray). The extent in which the first pixel G1 moves when the Fresnel lens 12 moves in this embodiment is the extent (the extent surrounded by the thick solid line in the figure) formed by second pixels G2 (the pixels are shown as hatched ones) located adjacent to the first pixel G1 in such a way that the second pixels G2 surround the first pixel G1. In other words, the Fresnel lens 12 is allowed to move in such a way that a pixel G projected on the screen 10 moves by the distance corresponding to one pixel or smaller.

It is noted that in a distortion standard of the screen disposed in a typical rear projector, distortion tolerance is one pixel or smaller. That is, distortion within one pixel is unlikely recognized by the human eye. The same thing applies to the amount of movement of a pixel G. That is, movement of a pixel G by the distance corresponding to one pixel or smaller is unlikely recognized by the human eye. Therefore, in this embodiment, the Fresnel lens 12 is allowed to move in such a way that a projected pixel G moves by the distance corresponding to one pixel or smaller.

FIG. 3 schematically shows the relationship between the motion of the Fresnel lens 12 described above and a speckle pattern generated in the space above the screen 10 or on the retina of the human eye. Specifically, FIG. 3 shows that when the Fresnel lens 12A (indicated by the solid line in FIG. 3) moves to the position of the Fresnel lens 12B (indicated by the double-dashed line in FIG. 3), the generated speckles 13 (13A) also move to the positions of the speckles 13B in accordance with the movement of the Fresnel lens 12.

As shown in FIG. 3, the speckles 13 can be taken as a stationary interference pattern (speckle pattern) because the wavelength distribution of the incident light is substantially the same on the temporal axis and hence the speckles 13 due to wave interference are generated in the substantially same positions. The motion of the Fresnel lens 12 moves the speckle pattern in a similar manner, not only preventing the speckle pattern from being visually recognized as a stationary speckle pattern but also apparently increasing the amount of speckles 13. Therefore, in addition to the increase in speckles 13 due to the diffusion capability described above, the amount of speckles 13 further increases, so that the brightness is made uniform.

The first embodiment described above provides the following advantages:

(1)

The screen 10 of this embodiment includes the lenticular lens 11 as the first layer having viewing angle control means for enlarging the viewing angle and the Fresnel lens 12 as the second layer having angular conversion means for converting the angles of incidence of the incident light beams into the substantially same direction. The Fresnel lens 12 also has a diffusion capability. Such a configuration allows scattered waves with phases different from each other to be superimposed so as to increase interference that causes speckles 13, resulting in uniform brightness. The moving means moves the Fresnel lens 12 relative to the lenticular lens 11. The stationary interference pattern (speckle pattern) is thus moved to not only prevent it from being visually recognized as a stationary speckle pattern but also apparently increase the amount of speckles 13. Therefore, in addition to the increase in the speckles 13 due to the diffusion capability, the speckles 13 further increases, so that the brightness is made uniform. It is therefore possible to make the speckles 13 less visible to the viewer (the viewer feels less glare). The Fresnel lens 12 moves in the direction substantially parallel to the lenticular lens 11. Such a motion prevents a gap between the two layers from increasing, suppressing reduction in image quality, such as image blur, associated with the motion.

(2)

In this embodiment, the screen 10 includes the lenticular lens 11 as the first layer having viewing angle control means for enlarging the viewing angle and the Fresnel lens 12 as the second layer having angular conversion means for converting the angles of incidence of the incident light beams into the substantially same direction. This configuration is similar to that of a typical screen, for example, a screen employed in a current rear projector. Therefore, by adding moving means, the invention can be easily applied.

(3)

When the screen 10 of this embodiment is employed in a rear projector, the lenticular lens 11 as the first layer of the screen 10 is typically disposed on the exterior side of the rear projector, and the Fresnel lens 12 as the second layer is disposed on the back side of the first layer (lenticular lens 11) (interior side of the rear projector). Since the lenticular lens 11 as the first layer thus becomes the member that directly faces the viewer and the Fresnel lens 12 as the second layer has the moving means, the viewer will not come into direct contact with the Fresnel lens 12 when the Fresnel lens 12 moves, preventing the viewer from touching the Fresnel lens 12 and hence improving the safety of the viewer. This configuration can also improve the reliability of the screen 10 capable of reducing the speckles 13. Moreover, the fact that the motion of the Fresnel lens 12 is not visible to the viewer is effective in reducing fatigue of the viewer when the viewer keeps observing images projected on the screen 10.

(4)

In this embodiment, the linear velocity V of the motion of the Fresnel lens 12 is at least P×50 (mm/sec) (V=5 mm/sec in this embodiment). It is therefore possible to take into account the frequency response of the human eye and characteristics of how the lens pitch P of the Fresnel lens 12 changes the speckle pattern, making the speckles 13 less recognizable.

(5)

In this embodiment, the extent in which the Fresnel lens 12 moves is set in such a way that the first pixel G1 moves within the extent formed by the second pixels G2 located adjacent to and surrounding the first pixel G1, where the first pixel G1 is a pixel of the pixels G projected on the screen 10. In this way, when the Fresnel lens 12 moves, the projected image is not likely recognized as a shifted image.

Second Embodiment

FIG. 4 is a schematic view showing the relationship between the screen according to a second embodiment of the invention and incident light. The configuration and operation of the screen 20 will be described with reference to FIG. 4.

As shown in FIG. 4, the screen 20 has the substantially same configuration as that of the screen 10 in the first embodiment except that in the first embodiment, the second layer has the diffusion capability and moves relative to the first layer with no diffusion capability, while in the second embodiment, the first and second layers both have diffusion capabilities. As for the motion of the first and second layers, at least one of the layers moves relative to the other.

Specifically, the configuration in this embodiment includes a lenticular lens 21 as the first layer having viewing angle control means for enlarging the viewing angle and a Fresnel lens 22 as the second layer having angular conversion means for converting the angles of incidence of incident light beams into the substantially same direction. The lenticular lens 21 and the Fresnel lens 22 both have diffusion capabilities. The diffusion capability is realized by adding light diffusing material similar to that in the first embodiment into the bodies of the lenticular lens 21 and the Fresnel lens 22 in a substantially uniform manner.

In this embodiment, the Fresnel lens 22 has moving means and moves relative to the lenticular lens 21. As in the first embodiment, the Fresnel lens 22 moves in the direction substantially parallel to the lenticular lens 21. Such a motion prevents a gap between the two layers from increasing.

In the screen 20 having such a configuration, the light diffusing material in the Fresnel lens 22 converts the incident light entering the Fresnel lens 22 into scattered waves with their phases shifted and disturbed, which exit from the Fresnel lens 22 and enter the lenticular lens 21. The light incident on the lenticular lens 21 passes through the light diffusing material in the lenticular lens 21, becomes scattered waves with further shifted and disturbed phases, and exits from the lenticular lens 21. The light exits from the lenticular lens 21 with its direction oriented especially in the horizontal direction. The exiting light beams (scattered light beams) that exit from the lenticular lens 21 (exit from the screen 20) interfere each other. In such operation, the amount of generated speckles further increases, resulting in further uniform brightness compared to the case where only one of the layers has the diffusion capability.

The Fresnel lens 22 has the moving means as described above, which moves the Fresnel lens 22 having the diffusion capability in the direction substantially parallel to the layer of the lenticular lenses 21 that faces the Fresnel lens 22 (indicated by the solid-line arrow in FIG. 4). Such a motion prevents a gap between the lenticular lenses 21 and the Fresnel lens 22 from increasing. In this embodiment, the lenticular lens 21 is fixed and hence does not move.

The motion of the Fresnel lens 22 moves the speckle pattern in a similar manner, not only preventing the speckle pattern from being visually recognized as a stationary speckle pattern but also apparently increasing the amount of speckles. Therefore, in addition to the increase in speckles due to the diffusion capability described above, the amount of speckles further increases, so that the brightness is made uniform.

The generated speckle pattern is the combination of the speckle pattern generated by the Fresnel lens 22 and that generated by the lenticular lens 21. The moving means may move the Fresnel lens 22 only by a distance substantially corresponding to the particle diameter of the diffusing material, which is a minute amount of movement.

The Fresnel lens 22 does not perform a reciprocating motion in one direction but a motion at a linear velocity, as in the first embodiment. Now, let V be the linear velocity of the Fresnel lens 22 and P be the lens pitch of the Fresnel lens 22. The linear velocity V in this embodiment can then be calculated by the equation (2).

$$0 < V \leq P \times 50 \text{ (mm/sec)} \quad (2)$$

It is noted that the equation (2) takes into account the frequency response (afterimage period) of the human eye and characteristics of how the lens pitch P of the Fresnel lens 22 changes the speckle pattern.

Since the lens pitch P of the Fresnel lens 22 in this embodiment is 0.1 mm, the linear velocity V may have a value within the range of $0<V\leq 5$ mm/sec according to the equation (2). In this embodiment, the linear velocity V is 1 mm/sec.

When the lenticular lens 21 and the Fresnel lens 22 both have the diffusion capability as realized in this embodiment, the amount of change in the speckle pattern resulting from the superposition of the diffusion capabilities (the combination of speckle patterns) is larger than the amount of change in the speckle pattern resulting from the lens pitch-to-lens pitch motion of the Fresnel lens 22. Therefore, in this embodiment, in addition to the superposition of the diffusion capabilities of the lenticular lens 21 and the Fresnel lens 22, the motion of the Fresnel lens 22 at a low linear velocity V (V=1 mm/sec) described above effectively reduces the speckle pattern.

The second embodiment described above provides the following advantages:

(1)

The screen 20 of this embodiment includes the lenticular lens 21 as the first layer having viewing angle control means for enlarging the viewing angle and the Fresnel lens 22 as the second layer having angular conversion means for converting the angles of incidence of the incident light beams into the substantially same direction. The lenticular lens 21 and the Fresnel lens both have the diffusion capability. This configuration allows scattered waves with phases different from each other to be superimposed so as to further increase interference that causes speckles compared to the first embodiment, resulting in uniform brightness. The moving means moves the Fresnel lens 22 relative to the lenticular lens 21. The stationary speckle pattern can be thus moved, not only preventing it from being visually recognized as a stationary speckle pattern but also apparently increasing the amount of speckles. Therefore, in addition to the increase in speckles due to the diffusion capability, the amount of speckles further increases, resulting in uniform brightness. It is therefore possible to make the speckles less visible to the viewer (the viewer feels less glare). The Fresnel lens 22 moves in the direction substantially parallel to the lenticular lens 21. Such a motion prevents a gap between the two layers from increasing, suppressing reduction in image quality, such as image blur, associated with the motion.

(2)

In the screen 20 of this embodiment, since the lenticular lens 21 and the Fresnel lens 22 both have the diffusion capability, the stationary speckle pattern can be less visible to the viewer by a smaller amount of movement than that provided by the moving means in the first embodiment.

(3)

In this embodiment, the screen 20 includes the lenticular lens 21 as the first layer having viewing angle control means for enlarging the viewing angle and the Fresnel lens 22 as the second layer having angular conversion means for converting the angles of incidence of the incident light beams into the substantially same direction. This configuration is similar to that of a typical screen, for example, a screen employed in a current rear projector. Therefore, by adding moving means, the invention can be easily applied.

(4)

When the screen 20 of this embodiment is employed in a rear projector, the lenticular lens 21 as the first layer of the screen 20 is typically disposed on the exterior side of the rear projector, and the Fresnel lens 22 as the second layer is disposed on the back side of the first layer (lenticular lens 21) (interior side of the rear projector). Since the lenticular lens 21 as the first layer thus becomes the member that directly faces the viewer and the Fresnel lens 22 as the second layer has the moving means, the viewer will not come into direct contact with the Fresnel lens 22 when the Fresnel lens 22 moves, preventing the viewer from touching the Fresnel lens 22 and hence improving the safety of the viewer. This configuration can also improve the reliability of the screen 20 capable of reducing the speckles. Moreover, the fact that the motion of the Fresnel lens 22 is not visible to the viewer is effective in reducing fatigue of the viewer when the viewer keeps observing images projected on the screen 20.

(5)

In this embodiment, since the lenticular lens 21 and the Fresnel lens 22 both have the diffusion capability, the superposition of the diffusion capabilities (the combination of speckle patterns) can further increase interference that generates speckles compared to the first embodiment, resulting in uniform brightness. Therefore, by moving the Fresnel lens 22 at a linear velocity having a value within the range of $0<V\leq 5$ mm/sec (V=1 mm/sec in this embodiment), which is smaller than the linear velocity V of the Fresnel lens 12 in the first embodiment, it is possible to prevent the speckle pattern from being visually recognized as a stationary speckle pattern.

Third Embodiment

FIG. 5 is a schematic side cross-sectional view when the screen according to a third embodiment of the invention is applied to a rear projector. FIG. 6 is a schematic configuration diagram of the screen having moving means.

The configuration and operation of a rear projector 500 as a projector will be schematically described with reference to FIG. 5.

As shown in FIG. 5, the rear projector 500 generally includes a cabinet 510 as an external housing, a projector unit 520 as an image projection device, a control unit 530, a reflective mirror 540, a transmissive screen 30, a control circuit 110 that is a component of moving means, and a driver 120.

The cabinet 510 has a box shape with its back side (right side in FIG. 5) inclined and houses the projector unit 520, the control unit 530, and the reflective mirror 540 therein, as shown in FIG. 5. Although not specifically illustrated, the cabinet 510 houses a power supply unit that supplies power to various components of the rear projector 500, a cooling unit that cools the interior of the rear projector 500, an audio output section that outputs audio and the like as well as the projector unit 520, the control unit 530, and the reflective mirror 540. On the front side (left side in FIG. 5) of the cabinet 510, there is formed an opening 511 having a rectangular shape in the plan view, and the transmissive screen 30 is supported and secured at the circumferential edge of the opening 511.

The projector unit 520 is disposed on the bottom in the cabinet 510, as shown in FIG. 5. The projector unit 520 forms image light (optical image) L based on an image signal outputted from the control unit 530 and enlarges and projects it toward the reflective mirror 540. The projector unit 520 includes a light source 521, a light modulation device 522 (a liquid crystal panel, for example) that modulates the light beams emitted from the light source 521 based on the image signal to form the image light L, and a projection lens 523 that enlarges and projects the image light L.

The control unit 530, although not specifically illustrated, includes a tuner, an IF circuit, an audio detection circuit, an image detection circuit, an amplification circuit, and a CPU. The control unit 530 performs centralized control over the projector unit 520. The control unit 530, for example, extracts a broadcasting signal having a frequency corresponding to the channel selected through operation of a remote control (not shown), and outputs an image signal to the projector unit 520 as well as an audio signal to the audio output section (not shown).

The reflective mirror 540 is disposed on the back side in the upper portion of the cabinet 510, as shown in FIG. 5, and reflects the image light L projected through the projector unit 520 to the back side of the transmissive screen 30.

The screen 30 has a rectangular shape in the plan view and is supported and secured at the circumferential edge of the opening 511 of the cabinet 510. The screen 30 includes a Fresnel lens 32 disposed on the back side and a lenticular lens 31 disposed on the front side. The lenticular lens 31 and the Fresnel lens 32 are both formed of sheet-like members. The lenticular lens 31 and the Fresnel lens 32 both have diffusion capabilities. The screen 30 converts the image light L incident via the reflective mirror 540 into collimated light through the Fresnel lens 32, focuses the image light L as an image, converts the collimated light into diffused light through the lenticular lens 31, and projects the image light L from the back side to the front side to display the projected image.

The configuration and operation of moving means will be schematically described with reference to FIG. 6.

In this embodiment, the moving means for moving the screen 30 includes an electromagnetic member and a magnetic member. By driving the electromagnetic member to attract or stop attracting the magnetic member, the Fresnel lens 32 as the second layer is moved relative to the lenticular lens 31 as the first layer.

The screen 30 is supported and secured at the circumferential edge of the opening 511 of the cabinet 510 as described above. Specifically, the lenticular lens 31 is supported and secured at the circumferential edge of the opening 511, and the Fresnel lens 32 is supported and secured at the circumferential edge of the opening 511 via an elastic member, specifically, a spring member 131, as a motion support 130 that forms not only a support for supporting the screen 30 but also the moving means. In this way, the Fresnel lens 32 is supported and secured while it can move relative to the lenticular lens 31. The lenticular lens 31 and the Fresnel lens 32 are supported with the two lenses in close contact with each other. In this embodiment, as the spring member 131, two spring members 131A and 131B are disposed with a fixed distance therebetween on the bottom side of the Fresnel lens 32.

The moving means is disposed under the Fresnel lens 32 and includes the control circuit 110, the driver 120, and the motion support 130. The driver 120 includes an electromagnet 122 as the electromagnetic member described above, a magnetic piece 123 as the magnetic member, and a contact circuit 121 that drives the electromagnet 122. The motion support 130 includes the spring member 131 as the elastic member described above.

In this embodiment, two electromagnets 122A and 122B are disposed in positions facing each other on the bottom side of the Fresnel lens 32. The magnetic piece 123 in this embodiment is an iron plate. Two magnetic pieces 123A and 123B are disposed on the bottom side of the Fresnel lens 32 in the positions that substantially face the respective electromagnets 122. The magnetic piece 123 is not limited to an iron piece but may be other members as long as they have magnetism.

In this embodiment, the position of the electromagnet 122 is slightly shifted from the position of the magnetic piece 123 in order not to move the Fresnel lens 32 uniformly but in a complex manner.

The operation of the moving means will now be described.

The control circuit 110 is a circuit that outputs a control signal for moving the Fresnel lens 32. The contact circuit 121 in the driver 120 causes ON/OFF operations of contacts 121A and 121B based on the signal outputted from the control circuit 110, thus driving the electromagnet 122.

The operation when the contact 121A is switched between ON and OFF will be described below.

When the contact 121A is turned ON, an electric current flows through the electromagnet 122A and a magnetic field is induced around the electromagnet 122A. The magnetic field attracts the magnetic piece 123A disposed on the Fresnel lens 32. At this point, the Fresnel lens 32 presses the spring member 131A disposed on the Fresnel lens 32, that is, the magnetic piece 123A is attracted while the spring member 131A is compressed.

When the contact 121A is turned OFF, the current through the electromagnet 122A is interrupted and hence the magnetic field is also interrupted. The compressive force of the spring member 131A now serves to return the magnetic piece 123A that has been attracted to the electromagnet 122A to the original position.

It is noted that operation similar to that described above can be realized by switching the contact 121B between ON and OFF.

As described above, causing the ON/OFF operations of the contacts 121A and 121B drives the electromagnets 122A and 122B to attract the magnetic pieces 123A and 123B and return them through compressive forces of the spring members 131A and 131B in such a way that these two operations and the like act with each other, allowing the Fresnel lens 32 to move from the stationary state. The Fresnel lens 32 can be moved in a complex manner (the free-form curve arrow A in FIG. 6, for example) according to how to control the ON/OFF operation of the contacts 121A and 121B (how to control the control circuit 110), the magnitude of the magnetic force of the electromagnet 122, the strength of the spring member 131, the amount of positional shift of the magnetic piece 123 relative to the electromagnet 122 and the like.

The Fresnel lens 32 moves in the direction substantially parallel to the lenticular lens 31. Such a motion prevents a gap between the two layers from increasing, thus suppressing reduction in image quality, such as image blur, associated with the motion. The control circuit 110 continuously moves the Fresnel lens 32 while the projector unit 520 projects the image light L, so that the Fresnel lens 32 does not become stationary while the image light L is being projected.

Since the speckle pattern generated in the space above the screen 30 and on the retina of the human eye is the combination of the speckle patterns generated by the Fresnel lens 32 and the lenticular lens 31, the moving means may move the Fresnel lens 32 only by a distance substantially corresponding to the particle diameter of the diffusing material, which is a minute amount of movement.

The third embodiment described above provides the following advantages:

(1)

The moving means of this embodiment moves the Fresnel lens 32 that is a component of the screen 30 in a complex manner. This motion can move the stationary speckle pattern generated in the space above the screen 30 and on the retina of the human eye. Such a motion of the speckle pattern not only prevents it from being visually recognized as a stationary speckle pattern but also apparently increases the amount of speckles. Therefore, in addition to the increase in speckles due to the diffusion capability, the amount of speckles further increases and the brightness is made uniform. It is therefore possible to make the speckles less visible to the viewer (the viewer feels less glare).

(2)

The Fresnel lens 32 of this embodiment uses the moving means having the electromagnet 122 and the magnetic piece 123 to perform contactless motion. Such a configuration not only improves the durability of the screen 30 including the Fresnel lens 32 but also reduces noise generated by the oscillation of the Fresnel lens 32. Furthermore, in the rear projector 500 including such a screen 30, the durability of the screen 30 is improved and noise generated by the oscillation of the Fresnel lens 32 is reduced.

(3)

Since the moving means of this embodiment may move the Fresnel lens 32 by a minute distance, it is possible to reduce the strength of the electromagnet 122 in the driver 120 and the strength of the spring member 131 in the motion support 130, allowing reduction in size of the moving means and reduction in energy.

Fourth Embodiment

FIG. 7 is a schematic configuration diagram of the screen having moving means according to a fourth embodiment of the invention. The configuration and operation of the screen having moving means will be described with reference to FIG. 7.

In this embodiment, moving means for moving a screen 40 includes a metal member 222 that extends and shrinks in response to current variation. Current variation provided to the metal member 222 extends and shrinks the metal member 222, so that a Fresnel lens 42 as the second layer moves relative to a lenticular lens (not shown) as the first layer.

Two metal members 222 that extend and shrink (hereinafter referred to as extendable/shrinkable metal member 222) are disposed with a predetermined distance therebetween on the bottom side of the Fresnel lens 42 and at the circumferential edge of the opening 511 under the Fresnel lens 42. Two spring members 231 similar to those in the third embodiment are disposed as the moving means with a predetermined distance therebetween on the upper side of the Fresnel lens 42 and at the circumferential edge of the opening 511 above the Fresnel lens 42. The two extendable/shrinkable metal members 222 have a predetermined tensile force and support and secure the Fresnel lens 42 at the circumferential edge of the opening 511. Specifically, the extendable/shrinkable metal member 222 in this embodiment that extends and shrinks in response to current variation is BioMetal®.

The moving means is the same as that in the third embodiment and includes a control circuit 210, a driver 220, and a motion support 230. The driver 220 includes the extendable/shrinkable metal members 222 that extend and shrink in response to current variation described above and a contact circuit 221 that drives the extendable/shrinkable metal members 222. The motion support 230 includes the spring member 231 and the extendable/shrinkable metal members 222 as described above, and supports the motion of the Fresnel lens 42.

As described above, the two spring members 231, which are components of the motion support 230, are disposed on the upper side of the Fresnel lens 42, and the two extendable/shrinkable metal members 222, which are components of the motion support 230 and the driver 220, are disposed on the bottom side of the Fresnel lens 42. Specifically, the spring members 231 disposed on the upper side includes spring members 231A and 231B, and the extendable/shrinkable metal members 222 disposed on the bottom side includes extendable/shrinkable metal members 222A and 222B. The contact circuit 221 includes contacts 221A and 221B that correspond to the extendable/shrinkable metal members 222A and 222B and drive the extendable/shrinkable metal members 222.

The operation of the moving means will be described.

The control circuit 210 is a circuit that outputs a control signal for moving the Fresnel lens 42. The contact circuit 221 in the driver 220 causes ON/OFF operations of the contacts 221A and 221B based on a signal outputted from the control circuit 210 to drive the corresponding extendable/shrinkable metal members 222A and 222B.

The operation when the contact 221A is switched between ON and OFF will be described below.

When the contact 221A is turned ON, a predetermined current flows through the extendable/shrinkable metal member 222A, so that the extendable/shrinkable metal member 222A shrinks by a predetermined amount. This moves the Fresnel lens 42 downward and leftward in FIG. 7. In this case, the shrinkage of the extendable/shrinkable metal member 222A extends the spring member 231A via the Fresnel lens 42.

When the contact 221A is turned OFF, the current through the extendable/shrinkable metal member 222A is This serves to return the shrunk extendable/shrinkable metal member 222A to the original position. When the contact 221B is switched between ON and OFF, the spring member 231B acts in a symmetrical manner in response to the extension and shrinkage of the extendable/shrinkable metal member 222B.

As described above, causing the ON/OFF operations of the contacts 221A and 221B drives corresponding extendable/shrinkable metal members 222A and 222B, and the extension and shrinkage of the extendable/shrinkable metal members 222 and the spring members 231 allow the Fresnel lens 42 to move from its stationary state. The Fresnel lens 42 can be moved in a complex manner (the free-form curve arrow B in FIG. 7, for example) according to how to cause the ON/OFF operations of the contacts 221A and 221B (how to control the control circuit 210), the magnitudes of the extension and shrinkage of the extendable/shrinkable metal member 222 and the like.

The Fresnel lens 42 moves in the direction substantially parallel to the lenticular lens. Such a motion prevents a gap between the two layers from increasing, thus suppressing reduction in image quality, such as image blur, associated with the motion. The control circuit 210 controls the Fresnel lens 42 in such a way that the Fresnel lens 42 does not become stationary while the image light L is being projected, as in the third embodiment.

Since the speckle pattern generated in the space above the screen 40 and on the retina of the human eye is the combination of the speckle patterns generated by the Fresnel lens 42 and the lenticular lens, the moving means may move the Fresnel lens 42 by only a distance corresponding to the particle diameter of the diffusing material, which is a minute amount of movement.

The fourth embodiment described above provides the following advantages:

(1)

The moving means of this embodiment moves the Fresnel lens 42 that is a component of the screen 40 in a complex manner. This motion can move the stationary speckle pattern generated in the space above the screen 40 and on the retina of the human eye. Such a motion of the speckle pattern not only prevents it from being visually recognized as a stationary speckle pattern but also apparently increases the amount of speckles. Therefore, in addition to the increase in speckles due to the diffusion capability, the amount of speckles further increases and the brightness is made uniform. It is therefore possible to make the speckles less visible to the viewer (the viewer feels less glare).

(2)

The Fresnel lens 42 of this embodiment employs the moving means including the extendable/shrinkable metal members 222 and the like. A metal member that extends and shrinks in response to current variation exerts a force but typically takes a long time to extend and shrink, so that such a metal member has not frequently been used as a typical driving source. However, BioMetal® as the extendable/shrinkable metal member 222 can be used in this embodiment as effective moving means without any problem despite a long time required for extension and shrinkage (moving time).

(3)

Since the moving means of this embodiment may move the Fresnel lens 42 by a minute amount, it is possible to reduce the tensile and compressive forces of the extendable/shrinkable metal members 222 in the driver 220 and the like, allowing reduction in size of the moving means and reduction in energy. Noise generated by the oscillation of the Fresnel lens 42 is also reduced.

Fifth Embodiment

FIG. 8 is a schematic configuration diagram of the screen according to a fifth embodiment of the invention. The configuration and operation of the screen will be described with reference to FIG. 8.

This embodiment has a configuration in which a protective member is disposed between the first and second layers to protect the first and second layers. Specifically, as shown in FIG. 8, a sheet-like protective member 53 is disposed between a lenticular lens 51 as the first layer and a Fresnel lens 52 as the second layer. The lenticular lens 51, the protective member 53 and the Fresnel lens 52 are in close contact with each other without any gap.

The lenticular lens 51 as the first layer and the Fresnel lens 52 as the second layer have the projections and depressions in the surfaces that face each other, which come into close contact with each other. Thus, when one of the layers moves relative to the other, the projections and depressions rub each other to cause deformation thereof, depending on the conditions of the motion, for example, when there is a certain amount of play in the front/rear direction. If the projections and depressions are deformed, there will be degradation in the viewing angle control function and the angular conversion function imparted to the respective layers. It is noted that in FIG. 8, reference character 51A denotes the projections and depressions of the lenticular lens 51 and reference character 52A denotes the projections and depressions of the Fresnel lens 52.

The protective member 53 disposed on the surfaces of the projections and depressions of the lenticular lens 51 and the Fresnel lens 52 prevents the deformation of the projections and depressions due to rubbing or the like during the motion. The protective member 53 has smooth surfaces having small coefficients of friction with respect to the lenticular lens 51 and the Fresnel lens 52 and thus excellent slidability. The protective member 53 may be a highly transparent member to transmit the light that exits from the Fresnel lens 52 to the lenticular lens 51. Furthermore, the protective member 53 may be a member to which a diffusion capability is imparted, or may be made of a material with good extendability. The above characteristics may be determined as appropriate according to the amount of exiting light that exits from the lenticular lens 51, image quality and the like.

The fifth embodiment described above provides the following advantages:

(1)

The protective member 53 of this embodiment can prevent the deformation of the projections and depressions due to rubbing between the projections and depressions of the lenticular lens 51 and those of the Fresnel lens 52, thus suppressing degradation in functions of the lenticular lens 51 and the Fresnel lens 52.

(2)

Disposing the protective member 53 allows smooth motion of the lenticular lens 51 and the Fresnel lens 52. Therefore, use of such a screen 50 further reduces energy required for the moving means.

The invention is not limited to the embodiments described above, but various changes and modifications can be made thereto. Variations of the invention will be described below.

(First Variation)

In the above embodiments, although the configuration of the screen has been described with reference to a lenticular lens as the first layer and a Fresnel lens as the second layer, the configuration is not limited thereto. The first layer may be other members as long as they have viewing angle control means for enlarging the viewing angle, and the second layer may be other members as long as they have angular conversion means for converting the angles of incidence of incident light beams into the substantially same direction. For example, the first layer may be a member using a microlens array or a diffuser. The second layer may be a member using a hologram.

(Second Variation)

In the above embodiments, although the diffusion capability of the first and second layers is imparted by adding light diffusing material into the bodies of the layers in a substantially uniform manner, the method for imparting the diffusion capability is not limited thereto. A similar effect of imparting a diffusion capability can be provided by using chemical means, mechanical means or the like to provide minute or fine irregularities on the surfaces of the layers so as to form embossed or satin-finished surfaces. A similar effect can also be provided by using printing means or the like to impart a diffusion capability to the surfaces of the layers.

(Third Variation)

Although in the first embodiment, the Fresnel lens 12 as the second layer has the diffusion capability, the lenticular lens 11 as the first layer may have the diffusion capability instead of the Fresnel lens 12. In this case, the lenticular lens 11 may move in the direction substantially parallel to the Fresnel lens 12. When a rear projector employs the screen 10 in which the lenticular lens 11 moves, it is preferable to add a plate member or the like to protect the lenticular lens 11 from external contact and the like.

(Fourth Variation)

Although in the first embodiment, the Fresnel lens 12 moves at a linear velocity V of 5 mm/sec, the linear velocity is not limited thereto. For example, the Fresnel lens 12 may move at a linear velocity greater than 5 mm/sec. In this case, speckles become further less visible.

(Fifth Variation)

Although in the first embodiment, the Fresnel lens 12 has a substantially uniform (equi-interval) lens pitch P (P=0.1 mm), the lens pitch P is not limited thereto. For example, the Fresnel lens may have a non-uniform lens pitch P. In this case, for example, when the linear velocity V is determined according to the smallest lens pitch P, speckles in the region of the screen that faces the portion of the Fresnel lens having that lens pitch P can be less visible. Speckles can be less visible, although not so significant, also in the regions having lens pitches greater than P. Alternatively, for example, when the linear velocity V is determined according to the largest lens pitch P, speckles can be less visible across the screen.

(Sixth Variation)

Although in the second embodiment, the Fresnel lens 22 as the second layer moves relative to the lenticular lens 21 as the first layer, a similar effect can be provided by moving the lenticular lens 21 in the direction substantially parallel to the Fresnel lens 22.

(Seventh Variation)

Although in the second embodiment, the moving means moves the Fresnel lens 22 as the second layer relative to the lenticular lens 21 as the first layer, a similar effect can be provided by moving both the lenticular lens and the Fresnel lens 22 in such a way that the lenticular lens 21 moves in the direction substantially parallel to the layer that faces the lenticular lens 21 and the Fresnel lens 22 moves in the direction substantially parallel to the layer that faces the Fresnel lens 22. In particular, such a motion can further reduce the amount of movement caused by the moving means compared to the case where only one of the layers moves. Alternatively, when both the layers move by a distance similar to that in the case where only one of the layers moves, the stationary speckle pattern can be less visible to the viewer.

(Eight Variation)

Although in the third and fourth embodiments, the Fresnel lenses 32 and 42 as the second layer have moving means, the lenticular lens as the first layer may have the moving means, providing a similar effect. When the screen 30 or 40 is applied to the rear projector 500, it is preferable to add a plate member or the like to protect the lenticular lens from external contact, since the externally disposed lenticular lens moves.

(Ninth Variation)

Although in the third and fourth embodiments, the Fresnel lenses 32 and 42 as the second layer have moving means, the lenticular lens as the first layer may also have the moving means and both the Fresnel lens and the lenticular lens may move in such a way that the lenticular lens moves in the direction substantially parallel to the layer that faces the lenticular lens and the Fresnel lens moves in the direction substantially parallel to the layer that faces the Fresnel lens. In this case, speckles can be further less visible to the viewer.

(Tenth Variation)

Although in the third embodiment, the driver 120 in the moving means has the electromagnet 122 as the electromagnetic member and the magnetic piece 123 as the magnetic member, and the electromagnet 122 is driven to move the Fresnel lens 32 in a complex manner, the operation is not limited thereto. For example, the driver 120 may have a solenoid or crank mechanism to perform a reciprocating motion to move the Fresnel lens 32. Alternatively, the rotational motion of a motor may be used to directly rotate the Fresnel lens 32, or a mechanical component, such as an eccentric shaft, a cam and a link, is used to move the Fresnel lens 32.

(Eleventh Variation)

Although in the fourth embodiment, the moving means uses BioMetal® as the extendable/shrinkable metal member 222 that extends and shrinks in response to current variation, the moving means is not limited thereto. For example, a shape memory alloy using thermal change can be used.

(Twelfth Variation)

Although in the third and fourth embodiments, the moving means uses a member using magnetism and a member using material physical characteristics, the moving means is not limited thereto. For example, the moving means can use a member using a piezoelectric effect, a member using air pressure, a member using acoustic waves, and a member using heat.

(Thirteenth Variation)

Although in the previous embodiments, the direction in which the moving means moves a layer is the direction substantially parallel to the surface that faces the layer and the motion is a complex motion, the motion is not limited thereto. For example, the motion may be performed along a single axis in the direction substantially parallel to the surface that faces the layer. Alternatively, the motion may be performed along multiple axes, for example, those drawing a circular path or other complex paths in the direction substantially parallel to the surface that faces the layer.

(Fourteenth Variation)

Although in the previous embodiments, the moving means is driven in a temporally irregular manner, the driving method is not limited thereto. For example, regular driving, such as periodic driving, may be used. Alternatively, a driving method suitable for the projected image or the screen may be employed by analyzing generation of speckles resulting from the projected image or analyzing generation of speckles resulting from the characteristics of the screen.

(Fifteenth Variation)

In the third embodiment, two magnetic pieces 123 in the driver 120, which is a component of the moving means, are disposed on the bottom side of the Fresnel lens 32. In the fourth embodiment, two extendable/shrinkable metal members 222 in the driver 220, which is a component of the moving means, are disposed on the bottom side of the Fresnel lens 42. However, the position where the driver is disposed and the number of drivers are not limited thereto, but can be other positions and numbers as appropriate.

(Sixteenth Variation)

Although in the previous embodiments, one moving means is provided to move the screen, the number of moving means is not limited thereto. For example, a plurality of moving means may be provided.

(Seventeenth Variation)

Although in the previous embodiments, the first and second layers are in close contact with each other, the structure of the first and second layers is not limited thereto. For example, there may be a gap between the first and second layers to the extent that the viewer cannot recognize image blur and the like.

(Eighteenth Variation)

Although in the previous embodiments, a screen formed of the first and second layers is used to implement the invention, the structure of the screen is not limited thereto. For example, another layer having diffusion means (referred to as a third layer) may be added as a layer that is a component of the screen. When the third layer is added, the order of the layers may be any of the following: for example, the third layer/the first layer/the second layer, the first layer/the third layer/the second layer, and the first layer/the second layer/the third layer. Furthermore, when the third layer is added, it is important to set the diffusion power in consideration of the amount of light that exits from the screen, image quality and the like.
(Nineteenth Variation)

Although in the previous embodiments, the description has been made of the case where the screen is a transmissive screen, the screen is not limited thereto. A similar effect is provided by applying a reflective screen.
(Twentieth Variation)

As the light modulation device in the projector using the screen of any of the above embodiments, a transmissive liquid crystal panel or a reflective liquid crystal panel (LCOS (Liquid Crystal On Silicon)) can be used.
(Twenty-first Variation)

Although a liquid crystal panel is used as the light modulation device in the projector using the screen of any of the above embodiments, the light modulation device is not limited thereto. In general, the light modulation device may be other devices as long as they modulate incident light according to image information, such as a micromirror light modulation device. An example of a micromirror light modulation device is a DMD (Digital Micromirror Device).
(Twenty-second Variation)

The light source in the projector using the screen of any of the above embodiments can be a discharge lamp, an LED (Light Emitting Diode), an LD (Laser Diode) and the like. When an LD is used as the light source, the wavelength of emitted laser light is substantially the same and hence speckles are easily generated, so that the screen of the invention is applied in an especially effective manner.

Although the best modes to carry out the invention have been disclosed in the above description, the invention is not limited thereto. That is, although the invention is illustrated and described mainly with reference to the specific embodiments, various variations (changes and modifications) can be made to the embodiments described above by those skilled in the art in terms of the detailed components, the shapes, materials and numbers of the components without departing from the scope of the technological spirit and object of the invention. Therefore, various variations made by those skilled in the art in terms of the detailed components, the shapes, materials and numbers of the components fall within the scope of the invention.

DESCRIPTION OF REFERENCE NUMERALS AND SIGNS

Figure 1:
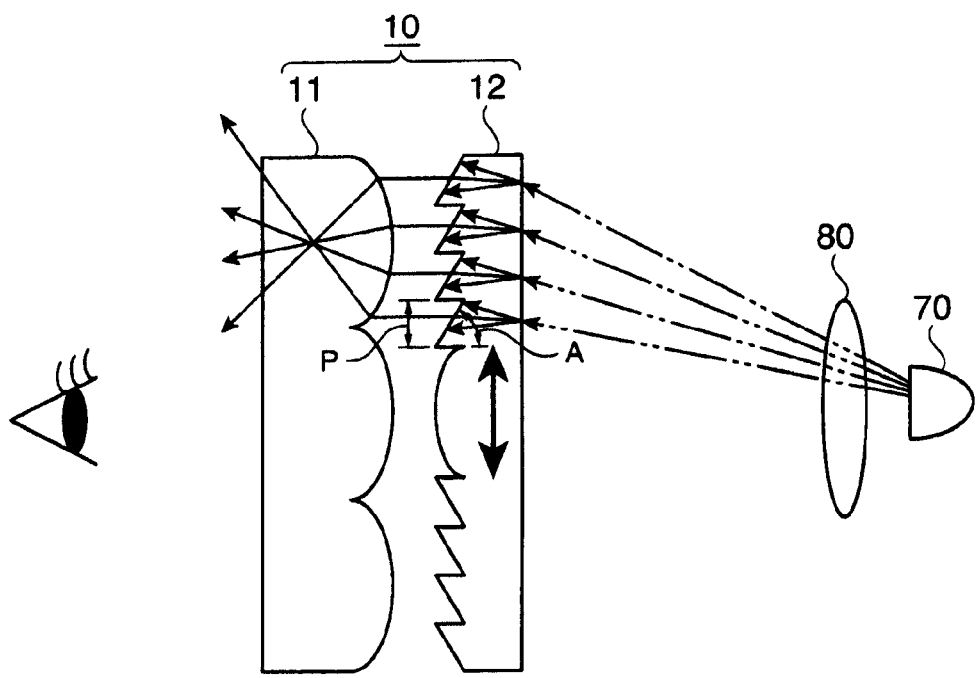
FIG. 1 is a schematic view showing the relationship between the screen according to a first embodiment of the invention and incident light.
Figure 2:
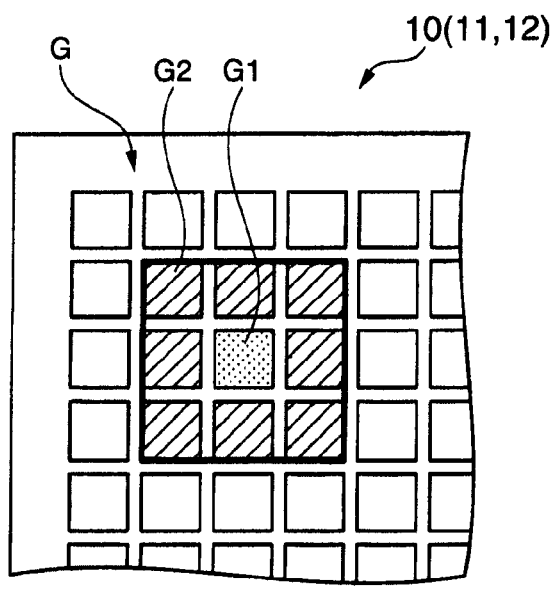
FIG. 2 is a schematic view showing the extent within which a second layer moves.
Figure 3:
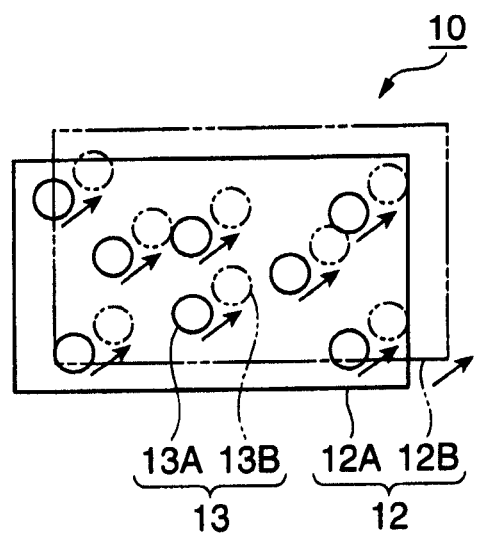
FIG. 3 is a schematic view showing the relationship between the motion of the second layer and a speckle pattern generated on the screen.
Figure 4:
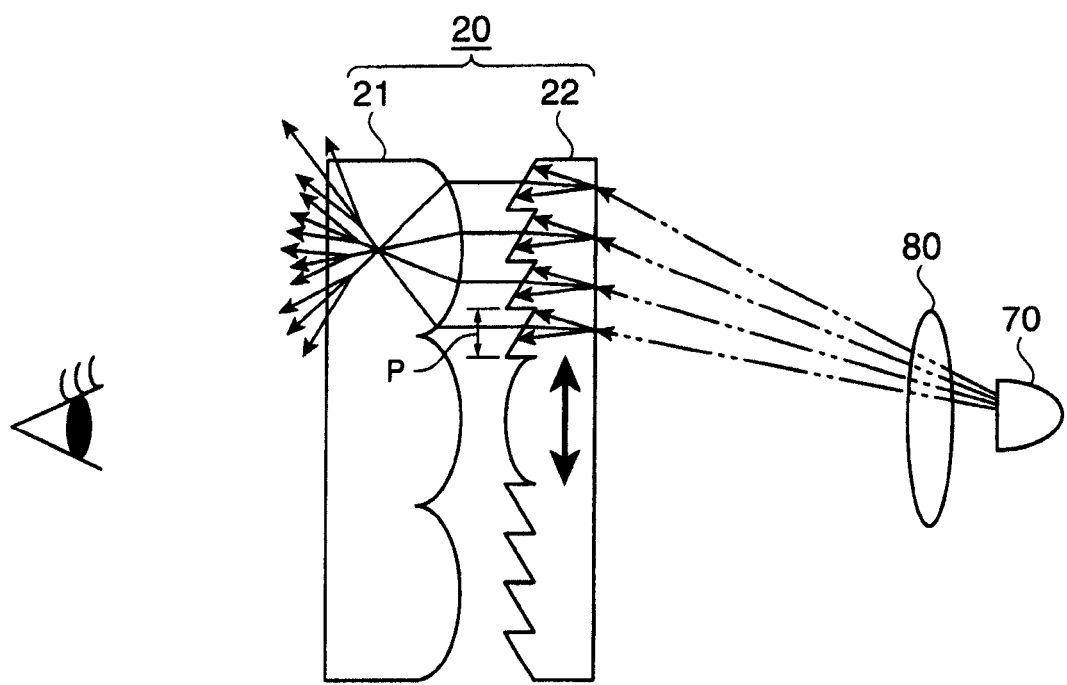
FIG. 4 is a schematic view showing the relationship between the screen according to a second embodiment of the invention and incident light.
Figure 5:
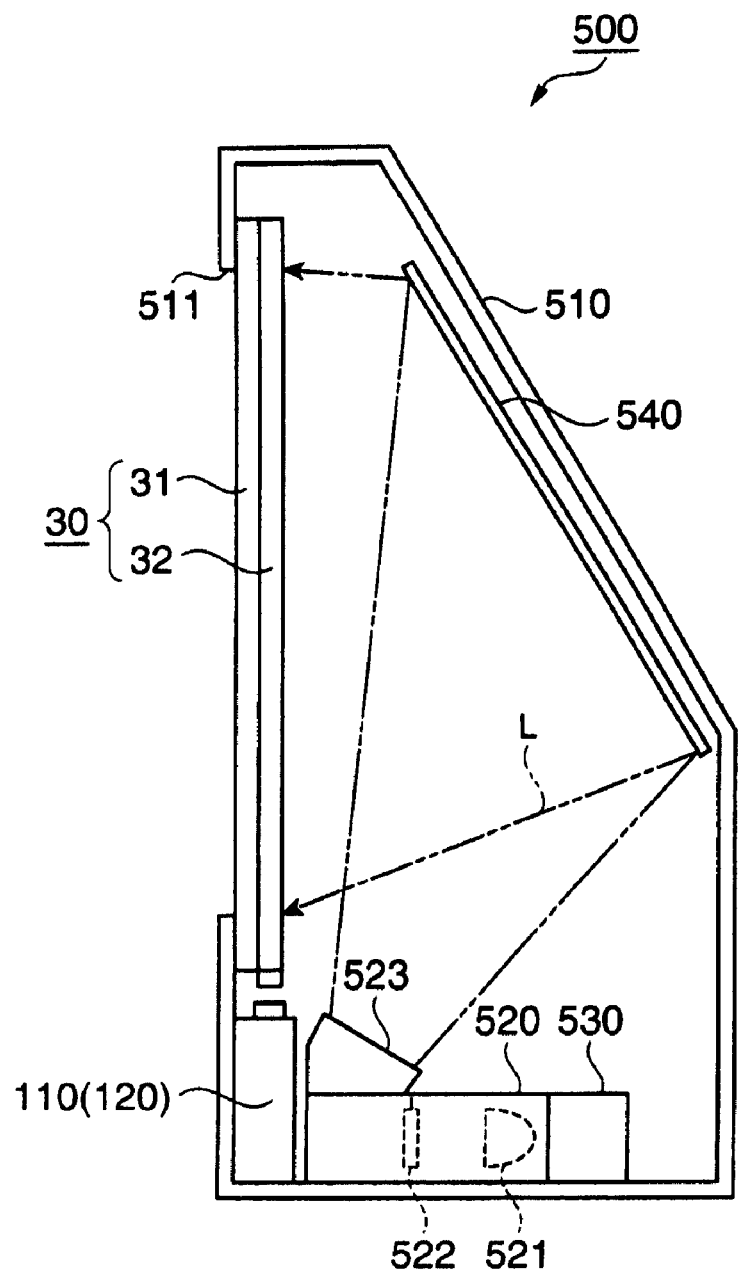
FIG. 5 is a schematic side cross-sectional view when the screen according to a third embodiment of the invention is applied to a rear projector.
Figure 6:
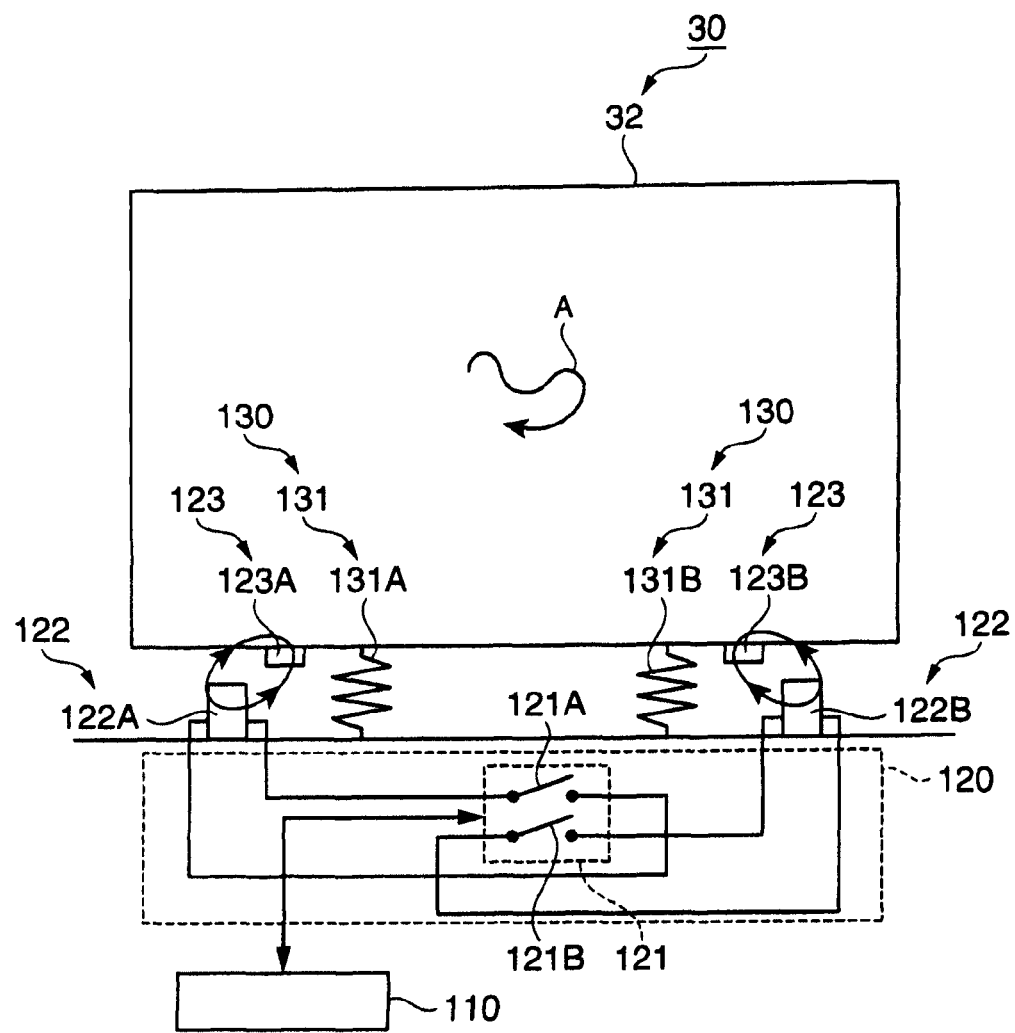
FIG. 6 is a schematic configuration diagram of the screen having moving means.
Figure 7:
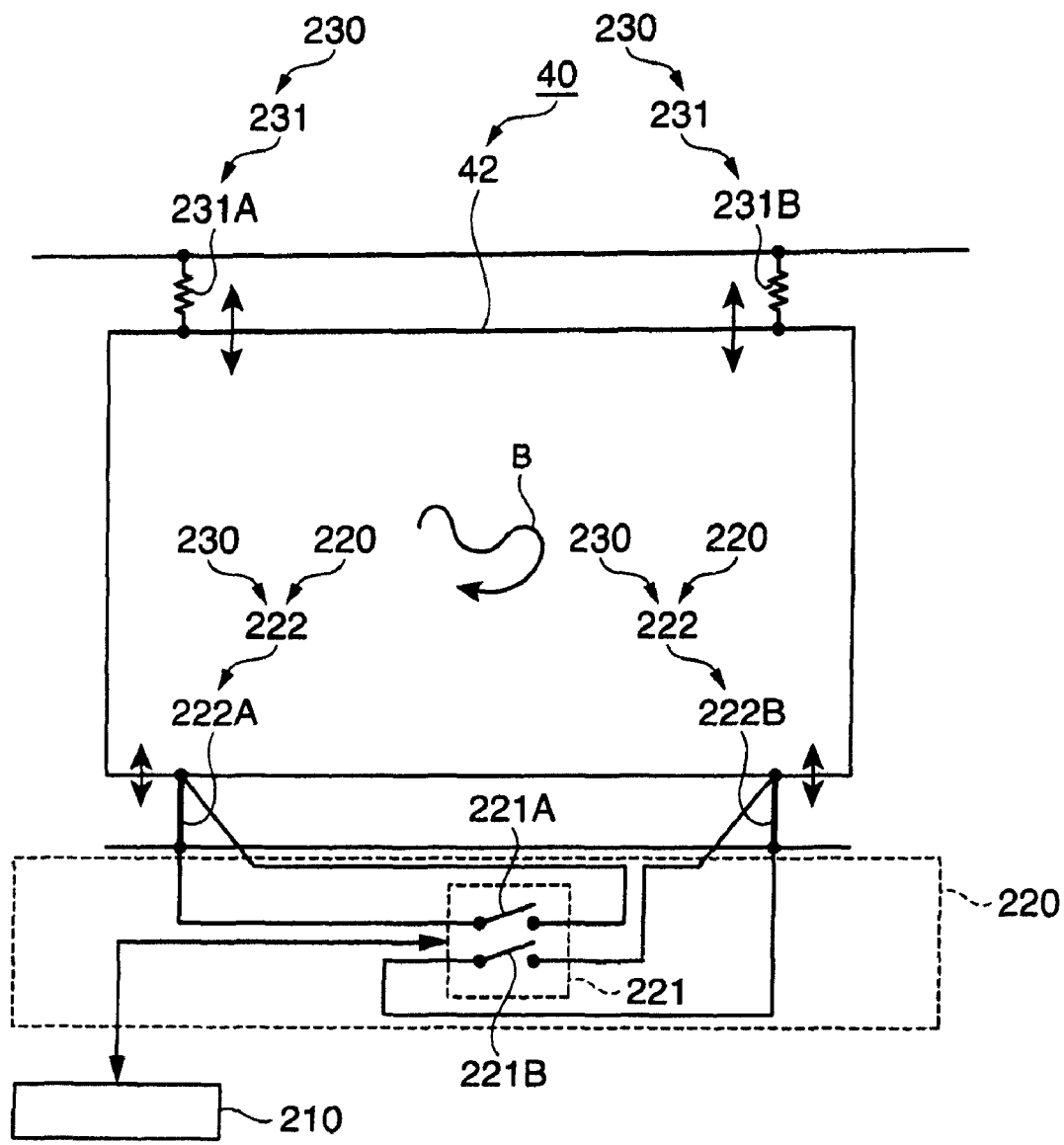
FIG. 7 is a schematic configuration diagram of the screen having moving means according to a fourth embodiment of the invention.
Figure 8:
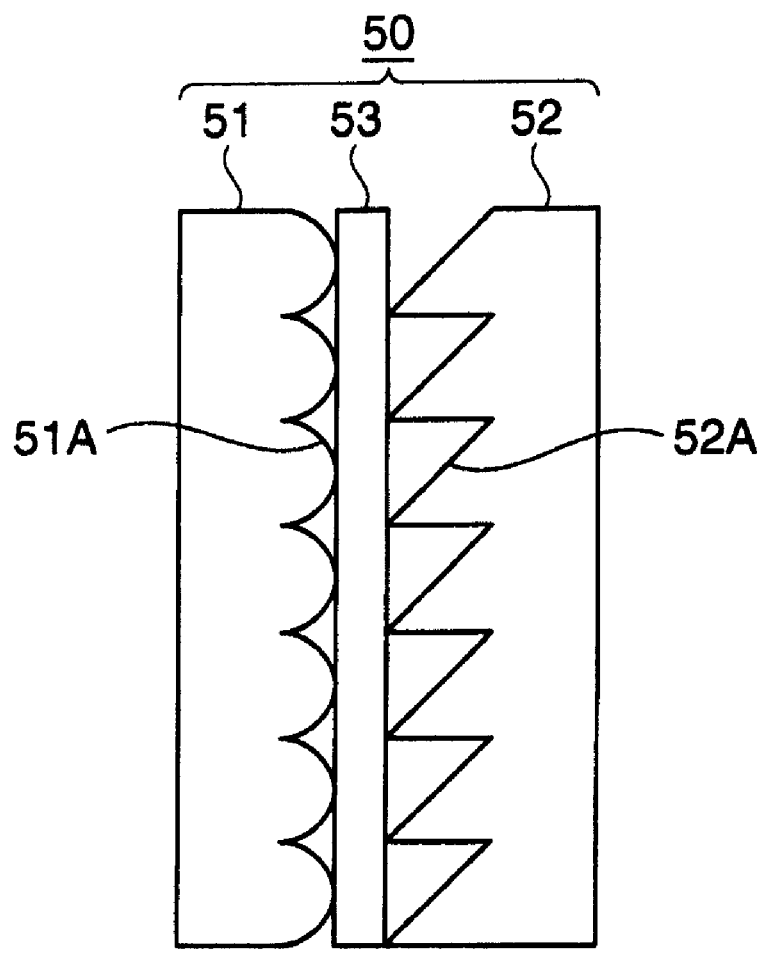
FIG. 8 is a schematic configuration diagram of the screen according to a fifth embodiment of the invention.

10, 20, 30, 40, 50: screen
11, 21, 31, 51: lenticular lens
12, 22, 32, 42, 52: Fresnel lens
13: speckle
53: protective member
70: light source
80: projection lens
110, 210: control circuit
120, 220: driver
121, 221: contact circuit
122: electromagnet
123: magnetic piece
130, 230: motion support
131: spring member
222: extendable/shrinkable metal member
500: rear projector
510: cabinet
511: opening
520: projector unit
521: light source
522: light modulation device
523: projection lens
530: control unit
540 reflective mirror

What is claimed is:

1. A screen on which light beams are incident comprising:
a first layer having viewing angle control means for enlarging viewing angle; and
a second layer having angular conversion means for converting angles of incidence of incident light beams into a substantially same direction, wherein
the first layer is fixed,
the second layer has a moving section for moving the second layer relative to the first layer,
the first layer is a lenticular lens and the second layer is a Fresnel lens,
one of the first and second layers diffuses the incident light beams, and
the Fresnel lens moves at a linear velocity V, expressed by $V \geq P \times 50$ (mm/sec), where P is the lens pitch of the Fresnel lens and V is the linear velocity.

2. The screen according to claim 1,
wherein in the case that an optical image formed by a light modulation device including a plurality of pixels is projected on the screen on a pixel basis, the Fresnel lens moves in such a way that a first pixel projected on the screen moves in association with the motion of the Fresnel lens within the extent formed by second pixels located adjacent to and surrounding the first pixel.

3. The screen according to claim 1,
wherein the moving section includes an electromagnetic member and a magnetic member.

4. The screen according to claim 1,
wherein the moving section includes a metal member that extends and shrinks in response to current variation.

5. The screen according to claim 1,
wherein the moving section moves the second layer in the direction substantially parallel to the layer that faces the moving layer.

6. The screen according to claim 1,
wherein a protective member is disposed between the first and second layers to protect the first and second layers.

7. A screen on which light beams are incident comprising:
a first layer having viewing angle control means for enlarging viewing angle; and
a second layer having angular conversion means for converting angles of incidence of incident light beams into a substantially same direction, wherein
the first layer is fixed,
the second layer has a moving section for moving the second layer relative to the first layer,
the first layer is a lenticular lens and the second layer is a Fresnel lens,
both the first and second layers diffuses the incident light beams, and
the Fresnel lens moves at a linear velocity V, expressed by $0 < V \leqq P \times 50$ (mm/sec), where P is the lens pitch of the Fresnel lens and V is the linear velocity.

8. The screen according to claim 7,
wherein in the case that an optical image formed by a light modulation device including a plurality of pixels is projected on the screen on a pixel basis, the Fresnel lens moves in such a way that a first pixel projected on the screen moves in association with the motion of the Fresnel lens within the extent formed by second pixels located adjacent to and surrounding the first pixel.

9. The screen according to claim 7,
wherein the moving section includes an electromagnetic member and a magnetic member.

10. The screen according to claim 7,
wherein the moving section includes a metal member that extends and shrinks in response to current variation.

11. The screen according to claim 7,
wherein the moving section moves the second layer in the direction substantially parallel to the layer that faces the moving layer.

12. The screen according to claim 7,
wherein a protective member is disposed between the first and second layers to protect the first and second layers.

* * * * *